US008044838B1

(12) United States Patent
Barr et al.

(10) Patent No.: US 8,044,838 B1
(45) Date of Patent: Oct. 25, 2011

(54) METHODS AND SYSTEMS FOR DETERMINING THE PHASE CONSTANT FOR A DIELECTRIC MEDIUM

(75) Inventors: Samuel Allan Barr, Madison, AL (US); William David Maynard, Harvest, AL (US)

(73) Assignee: The Boeing Company, Chicago, IL (US)

( * ) Notice: Subject to any disclaimer, the term of this patent is extended or adjusted under 35 U.S.C. 154(b) by 733 days.

(21) Appl. No.: 12/190,738

(22) Filed: Aug. 13, 2008

(51) Int. Cl.
| G01S 7/40 | (2006.01) |
| G01S 13/00 | (2006.01) |
| G01V 3/08 | (2006.01) |
| G01N 27/60 | (2006.01) |
| G01R 27/00 | (2006.01) |
| G01R 27/26 | (2006.01) |

(52) U.S. Cl. .......... 342/22; 342/165; 342/173; 342/174; 342/175; 342/192; 324/326; 324/452; 324/600; 324/658; 324/663; 324/674; 324/681

(58) Field of Classification Search .......... 342/22, 342/165, 173, 174, 175, 192; 324/326, 452, 324/600, 658, 663, 674, 681
See application file for complete search history.

(56) References Cited

U.S. PATENT DOCUMENTS

| 3,803,595 | A | * | 4/1974 | McMillan | 342/192 |
| 4,415,898 | A | * | 11/1983 | Gaunaurd et al. | 342/192 |
| 4,507,602 | A | * | 3/1985 | Aguirre | 324/638 |
| 4,831,383 | A | * | 5/1989 | Ohnishi et al. | 342/22 |
| 4,839,654 | A | * | 6/1989 | Ito et al. | 342/22 |
| 5,249,463 | A | * | 10/1993 | Willson et al. | 73/290 R |
| 5,327,139 | A | * | 7/1994 | Johnson | 342/22 |
| RE35,607 | E | * | 9/1997 | Nagamune et al. | 702/158 |
| 5,745,071 | A | * | 4/1998 | Blackmon et al. | 342/90 |
| 6,078,280 | A | * | 6/2000 | Perdue et al. | 342/124 |
| 6,220,080 | B1 | * | 4/2001 | Fauque | 324/662 |
| 6,477,474 | B2 | * | 11/2002 | Diede | 702/57 |
| 6,480,141 | B1 | * | 11/2002 | Toth et al. | 342/22 |
| 6,522,285 | B2 | * | 2/2003 | Stolarczyk et al. | 342/22 |
| 6,573,855 | B1 | * | 6/2003 | Hayakawa et al. | 342/22 |
| 6,590,519 | B2 | * | 7/2003 | Miceli et al. | 342/22 |
| 6,617,591 | B1 | * | 9/2003 | Simonson et al. | 250/459.1 |
| 6,624,781 | B1 | * | 9/2003 | Collins | 342/22 |
| 6,690,320 | B2 | * | 2/2004 | Benway et al. | 342/124 |
| 6,700,526 | B2 | * | 3/2004 | Witten | 342/22 |
| 7,034,740 | B2 | * | 4/2006 | Witten | 342/22 |
| 7,109,910 | B1 | * | 9/2006 | Steinway et al. | 342/22 |
| 7,113,124 | B2 | * | 9/2006 | Waite | 342/22 |
| 7,183,964 | B2 | * | 2/2007 | Steinway et al. | 342/22 |
| 7,320,271 | B2 | * | 1/2008 | Hintz | 89/1.13 |
| 7,525,476 | B1 | * | 4/2009 | Delin et al. | 342/124 |
| 7,548,181 | B1 | * | 6/2009 | Bausov | 342/22 |
| 7,586,435 | B1 | * | 9/2009 | Edvardsson | 342/124 |
| 7,834,801 | B2 | * | 11/2010 | Waite et al. | 342/22 |
| 2006/0087471 | A1 | * | 4/2006 | Hintz | 342/22 |
| 2007/0152866 | A1 | * | 7/2007 | Nelson | 342/22 |

* cited by examiner

Primary Examiner — Thomas Tarcza
Assistant Examiner — Peter Bythrow
(74) Attorney, Agent, or Firm — Armstrong Teasdale LLP

(57) ABSTRACT

A method for determining a phase constant for a dielectric medium is provided. The method includes deploying a calibration object with a known free-space spectral response within a dielectric medium of interest, determining the spectral response of the calibration object deployed in the dielectric medium, and determining the phase constant for the dielectric medium using a relationship between the free-space spectral response of the calibration object and the spectral response of the calibration object when deployed in the dielectric medium.

21 Claims, 3 Drawing Sheets

METHODS AND SYSTEMS FOR DETERMINING THE PHASE CONSTANT FOR A DIELECTRIC MEDIUM

BACKGROUND

The field of the disclosure relates generally to the detection of objects using resonant radio frequency location, and more specifically, to methods and systems for determining the phase constant of a dielectric medium within which such objects could be embedded.

The detection and identification of an object using resonant radio frequency (RF) location generally requires prior knowledge of the spectral response of the object to incident RF energy. However, when the object is embedded in a medium other than air, such as an object embedded in sand or other medium, the spectral response of the object, and thus its resonant frequencies, are shifted by a factor equal to $2\pi$ multiplied by frequency and divided by the phase constant of the medium and the wavelengths of the spectral components. The phase constant is a factor dependent upon frequency and the permeability/permittivity of the medium. Without knowledge of either the permeability/permittivity or the phase constant of the medium, the reflected spectral response, including the resonant frequencies, of a buried object cannot reliably be predicted, and resonant RF location cannot be effectively used to detect and identify the object.

The permeability, permittivity, and phase constant typically cannot be measured without access to a sample of the medium. Furthermore, the dielectric properties of certain media vary with conditions such as bulk density, water content, and composition. Thus, a permeability, permittivity, or phase constant measurement taken at one time cannot be used reliably to determine the spectral response of an embedded object at another time.

In the application of resonant RF location to cases like the detection of objects buried in a medium, such as sand, with unknown dielectric properties a method is needed for remotely and immediately determining the permeability and permittivity or phase constant of the medium.

BRIEF SUMMARY

In one aspect, a method for remotely determining the phase constant for a dielectric medium is provided. The method includes deploying a calibration object with a known free-space spectral response within a dielectric medium of interest, determining the spectral response of the calibration object deployed in the dielectric medium, and determining the phase constant for the dielectric medium using a relationship between the free-space spectral response of the calibration object and the spectral response of the calibration object when deployed in the dielectric medium.

Another aspect is directed to a system for determining the phase constant for a dielectric medium including a calibration object having a known free-space spectral response and capable of being deployed within a dielectric medium for which the phase constant is to be determined. The system also includes at least one transmitter, at least one receiver, the transmitter and receiver operable to determine a resonant frequency response of the calibration object when deployed within the dielectric medium, and a processor operable to determine the phase constant for the dielectric medium utilizing the known free-space spectral response and the resonant frequency response of the calibration object within the dielectric medium.

DETAILED DESCRIPTION

The herein described methods and systems provide a discriminating capability to resonant RF location techniques which are useful in applications that extend from concealed weapons detection to navigation. There are specific and enduring needs for improved perimeter security, concealed weapons detection, and basic situational awareness for military and civil applications. Example applications include, but are not limited to, extended range metallic and non-metallic detection, concealed weapons detection, particle detection in the processing of drugs, foods, textiles, etc., ranging with passive targets, GPS denied navigation, and covert electronic fences that are up to 100 meters in depth. Addition of the above described capabilities to known resonant RF locating techniques results in a relatively inexpensive product that provides improved performance in these applications.

Figure 1:
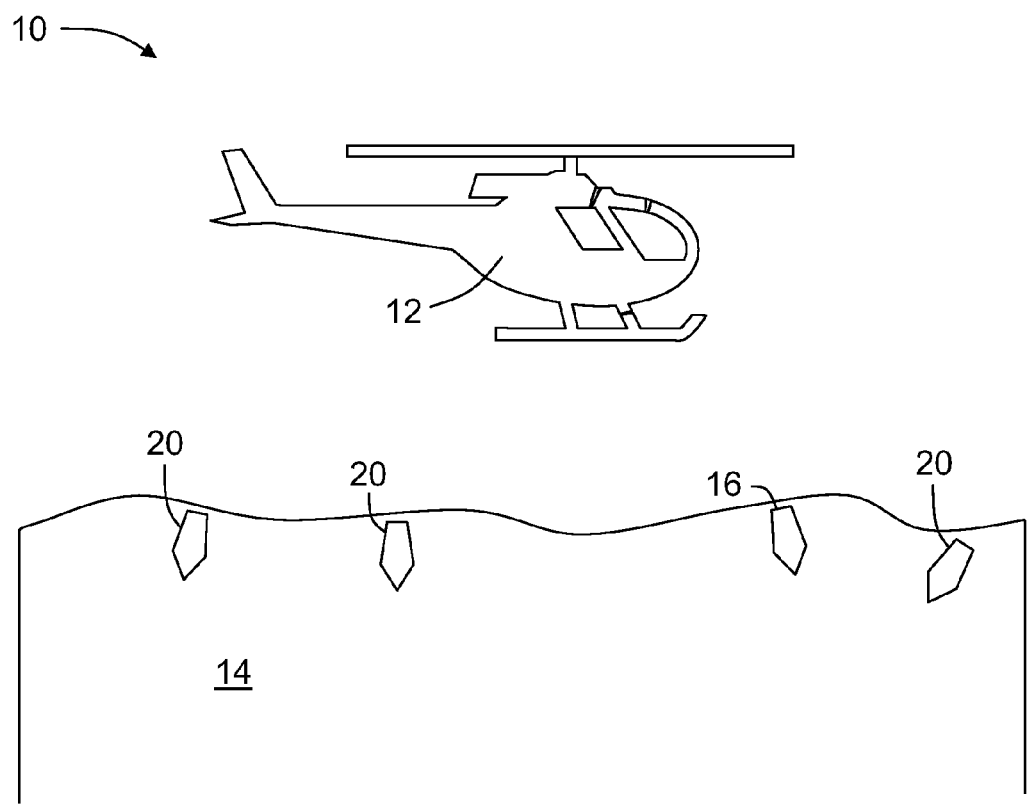
FIG. 1 is a view of a system for determining the phase constant of a dielectric medium.

Referring now to the Figures, FIG. 1 is an illustration of an exemplary system 10 for determining the phase constant of a dielectric medium. In system 10, an air vehicle 12 is located above a medium of interest. A calibration object 16 is located in the medium of interest, which is referred to herein as a dielectric medium 14. While described herein in terms of an air vehicle, it is to be understood that other vehicle, for example, a ground vehicle and a water vehicle could be utilized as well as a permanent ground-based location, which may be referred to herein as a base station or permanent station.

The calibration object 16 is configured to have a known free-space spectral response that is associated with a known free-space resonant frequency. In one embodiment, the calibration object 16 is configured such that it is capable of being deployed into the dielectric medium 14, for example, in the configuration of a projectile. In another embodiment (not illustrated), the calibration object 16 housed within a housing and the free-space resonant frequency of the combination is known, and the housing is configured to be deployed into the dielectric medium 14 as a projectile. In still another embodiment, the calibration object 16 housed within a housing and deployed from the housing into the dielectric medium 14 such that the housing does not affect a spectral response of the calibration object.

In another exemplary embodiment, the system may include additional calibration objects 20 that are equivalent to calibration object 16. All of the plurality of calibration objects 20 may have the same known free-space spectral response, or at least one of the plurality of calibration objects 20 may have a different known free-space spectral response. If multiple calibration objects 20 are used in a specific application, they are dispersed sufficiently far apart to prevent an individual calibration object 16, 20 from affecting the spectral response of the other calibration objects 16, 20.

Figure 2:
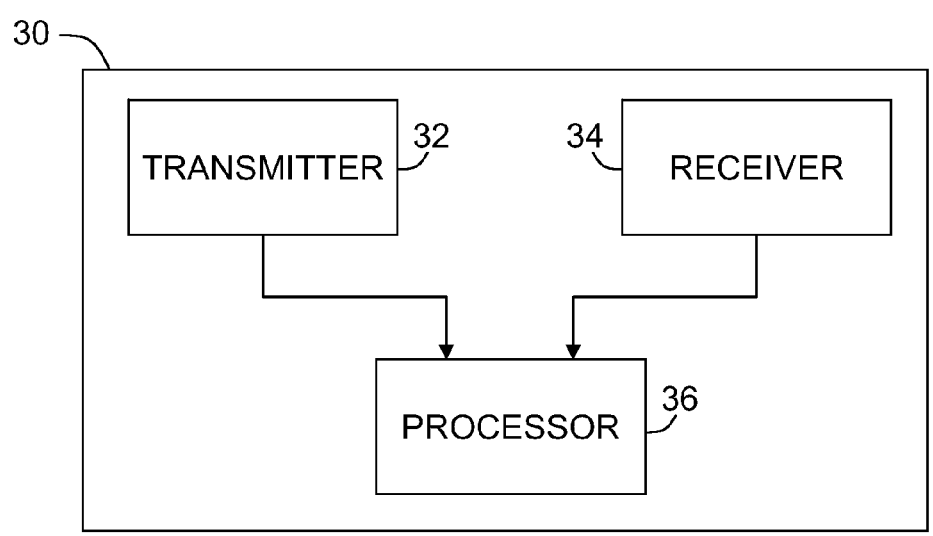
FIG. 2 is a schematic view of a detection device for the system of FIG. 1.

FIG. 2 is a schematic view of a detection device for the system of FIG. 1. In the exemplary embodiment, detection device 30 is deployed within air vehicle 12 (shown in FIG. 1).

Detection device 30 includes a transmitter 32, a receiver 34, and a processor 36. The transmitter 32 is capable of transmitting RF signals over a range of frequencies certain to include the resonant frequency of the calibration object 16 in the dielectric medium 14. The receiver 34 is capable of receiving an RF signal. Processor 36 is electronically coupled to both the transmitter 32 and the receiver 34. Processor 36 is further configured to calculate the phase constant of the dielectric medium 14 using the known free-space spectral response of calibration object 16 and the received spectral response from calibration object 16 in the dielectric medium 14, as is described below. In one alternative embodiment, detection device 30 includes more than one transmitter 32 and more than one receiver 34. In various embodiments, the transmitter 32 and receiver 34 are deployed together on a single vehicle, for example, an air vehicle, a ground vehicle, and a water vehicle or at a base station. In certain embodiment, the transmitter 32 and receiver 34 are deployed separately on the above listed locations. To provide a specific example, the transmitter 32 might be deployed in an air vehicle while the receiver 34 is deployed on a ground vehicle, both being communicatively coupled to the processor which is co-located with one of the transmitter 32 and receiver 34 or at a third location.

Figure 3A:
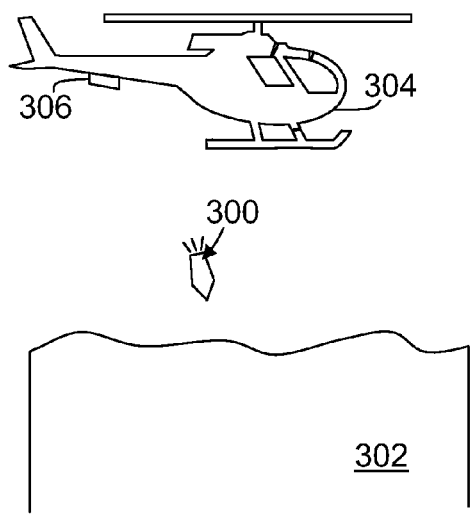
FIGS. 3A-3C are schematic views of a method for determining the phase constant of a dielectric medium.
Figure 3B:
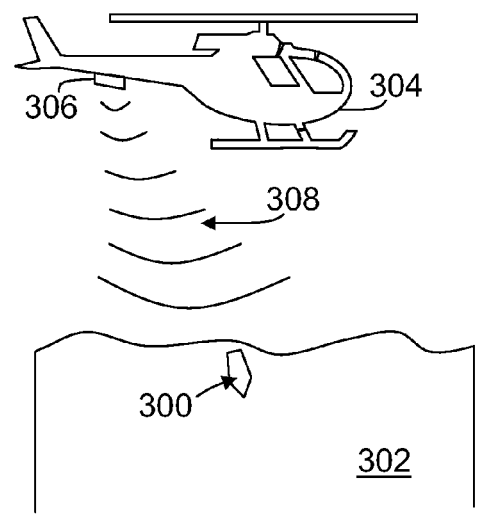
Figure 3C:
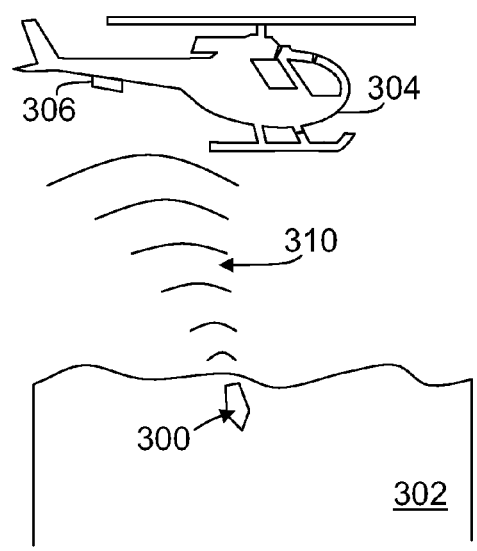

FIGS. 3A-3C are schematic views of a method for determining the phase constant of a dielectric medium. In FIG. 3A, a calibration object 300 is directed toward a dielectric medium 302 for deployment. As described above, the calibration object 300 has a known free-space spectral response that includes a known free-space resonant frequency. The calibration object 300 is deployed, for example, by being launched from an air vehicle 304, and is deployed within a housing and with a suitable velocity to embed itself within the dielectric medium 302. In one embodiment, the housing is a projectile having a shape conducive to deployment within a medium upon a launch from an air vehicle 304. While described herein in terms of being launched from air vehicle, alternative embodiments are contemplated that may be launched from a ground vehicle, a water vehicle, or from a permanent station.

In FIG. 3B, the calibration object 300 is embedded within the dielectric medium 302. A detection device 306 includes a transmitter which generates an RF signal 308. This detection device 306 may be located, for example, on the air vehicle 304. Because the approximate location of the calibration object 300 is known, the RF signal 308 can be directed towards the calibration object 300. The spectral response of the calibration object 300 is unaffected by its depth within the dielectric medium 302. The effect of depth is limited to an effect on the amplitude of any resonant response of the object 300 upon impingement by the RF signal 308.

While the calibration object 300 has a known free-space spectral response with a known resonant frequency in free space, the spectral response and resonant frequency of the calibration object 300 within the dielectric medium 302 are unknown. Thus, RF signals 308 are transmitted over a range of frequencies by the transmitter, which is sometimes referred to as a frequency sweep. When a signal 308 having the same frequency as the resonant frequency of the calibration object 300 in the dielectric medium 302 impinges or is otherwise recognized by the calibration object 300, the calibration object 300 will resonate and generate signal 310, as shown in FIG. 3C. The RF signals 310 generated by the resonance of the calibration object 300 are then received by a receiver on the detection device 306. Because the calibration object 300 is embedded within the dielectric medium 302, and not within free space, the spectral response of the calibration object 300 will be different than the known free-space spectral response of the calibration object 300.

After the reflected RF signal 310 is received by the receiver, a processor uses the known free-space spectral response of the calibration object 300 and the measured spectral response of the calibration object 300 to determine the phase constant of the dielectric medium 302, as described in the following paragraphs.

An electric field can be defined as $E(z)=E_0 e^{j\omega t} e^{j\omega(\sqrt{\mu\epsilon})z}$ (Equation 1). With respect to Equation 1, $E(z)$ is the electric field intensity in volts per meter (V/m) as a function of position along the z axis, $E_O$ is the electric field intensity in volts per meter (V/m) at z=0, t=0, $\omega$ is the frequency in radians per second (rad/s), $\mu$ is the magnetic permeability of the medium in Henrys per meter (H/m), $\epsilon$ is the effective complex dielectric permittivity of the medium in Farads per meter (F/m), t is the time in seconds (s), and z is the position in meters (m) along the z axis. The effective complex permittivity, $\epsilon$, is a parameter determined by both the dielectric permittivity of the medium, $\epsilon_d$ (which may itself be complex where $\epsilon_d = \epsilon'_d - j\epsilon''_d$), and the conductivity of the medium, $\sigma$, resulting in $$\varepsilon = \varepsilon_d - j\frac{\sigma}{\omega} = \varepsilon'_d - j\left(\varepsilon''_d + \frac{\sigma}{\omega}\right). \quad \text{(Equation 2)}$$

With respect to Equation 2, $\epsilon_d$ is the dielectric permittivity of the medium with real part $\epsilon'_d$ and imaginary part $\epsilon''_d$ in Farads per meter (F/m), and $\sigma$ is the conductivity of the medium in Siemens per meter (S/m). Equation 1 can be written in simpler form as $E(z)=E_0 e^{j\omega t} e^{-jkz}$ (Equation 3), where k is the wavenumber in reciprocal meters (m$^{-1}$), and is computed as $k=\omega\sqrt{\mu\epsilon}$ (Equation 4).

Because $\epsilon$ is, in general, complex, k may also be a complex value (represented as $\beta-j\alpha$), and as a result, Equation 3 can be written as $E(z)=E_0 e^{j\omega t} e^{-j(\beta-j\alpha)z} = E_0 e^{\alpha z} e^{j\omega t} e^{-j\beta z}$ (Equation 5).

The term $e^{-\alpha z}$ affects the magnitude of the electric field at a point z, while the term $e^{-j\beta z}$ affects only the phase of the electric field at a point z. $\alpha$ is therefore called the attenuation constant, while $\beta$ is called the phase constant. The attenuation and phase constants are defined in terms of the properties of the medium by $\alpha=-\text{Im}\omega\sqrt{\mu\epsilon}$ (Equation 6) and $\beta=\text{Re}\omega\sqrt{\mu\epsilon}$ (Equation 7).

For free space (vacuum) and for perfect (lossless) dielectrics, $\sigma=0$ and $\epsilon_d$ has no imaginary component, so $\sigma=0$ (Equation 8) and $\beta=\omega\sqrt{\mu\epsilon}$ (Equation 9).

By substituting Equation 2 into Equation 6, the attenuation constants for various media are computed as:

$$\alpha = \omega\sqrt{\frac{\mu\varepsilon'_d}{2}\left(\sqrt{1+\frac{\left(\varepsilon''_d+\frac{\sigma}{\omega}\right)^2}{(\varepsilon'_d)^2}}-1\right)}. \quad \text{(Equation 10)}$$

By substituting Equation 2 into Equation 7, the phase constants for these media are computed as:

$$\beta = \omega\sqrt{\frac{\mu\varepsilon'_d}{2}\left(\sqrt{1+\frac{\left(\varepsilon''_d+\frac{\sigma}{\omega}\right)^2}{(\varepsilon'_d)^2}}+1\right)}. \quad \text{(Equation 11)}$$

According to Equation 1, the electric field intensity of an electromagnetic wave traveling along the z axis varies sinusoidally as a function of z. At a given time, t, the wave intensity repeats along the z axis at a distance that represents the wavelength of the propagating wave. This wavelength is computed as $$\lambda = \frac{1}{f\sqrt{\mu\varepsilon}}, \quad \text{(Equation 12)}$$

where $\lambda$ is the wavelength in meters (m) and f is the frequency in Hertz (Hz). The velocity of propagation of a wave is defined as the change over time of the position along the z axis of a point of constant phase on the wave. The phase of the electromagnetic wave described by Equation 1 is $\omega t - \omega(\sqrt{\mu\varepsilon})z$ (Equation 13).

If this phase expression is set equal to a constant, a, and the derivative of the resulting equation is taken with respect to time, the result is $$\frac{d}{dt}\left(\varpi t - \omega(\sqrt{\mu\varepsilon})z\right) = \frac{d}{dt}(a) \quad \text{(Equation 14)}$$

or $$\varpi - \omega(\sqrt{\mu\varepsilon})\frac{dz}{dt} = 0 \quad \text{(Equation 15)}$$

which yields $$\frac{dz}{dt} = v = \frac{1}{\sqrt{\mu\varepsilon}} = \frac{c}{\sqrt{\mu_r\varepsilon_r}}, \quad \text{(Equation 16)}$$

where v is the velocity of propagation in meters per second (m/s), $\mu_r$ is the relativity permeability, and $\in_r$ is the relativity permittivity. For the case of free space (vacuum), $\mu = \mu_0$, $\in = \in_0$, and $v = c$, the speed of light in a vacuum, which is $2.99792458 \times 10^8$ m/s (typically approximated as $3 \times 10^8$ m/s). The wavelength can then be expressed for the specific case of free space as $$\lambda_{fs} = \frac{c}{f} \quad \text{(Equation 17)}$$

or for the general case as $$\lambda = \frac{v}{f} = \frac{c}{f\sqrt{\mu_r\varepsilon_r}} = \frac{\lambda_{fs}}{f\sqrt{\mu_r\varepsilon_r}}. \quad \text{(Equation 18)}$$

In a dielectric medium with complex dielectric permittivity, the velocity of propagation can be derived from the form of the electric field given in Equation 5 to be $$v = \frac{\omega}{\beta}, \quad \text{(Equation 19)}$$

where $\beta$ is the phase constant defined by Equation 11. Using this equation for velocity, the wavelength of the wave in a dielectric medium with complex permittivity can be determined by:

$$\lambda = \frac{1}{f\sqrt{\frac{\mu\varepsilon'_d}{2}\left(\sqrt{1 + \frac{(\varepsilon''_d + \frac{\sigma}{\omega})^2}{(\varepsilon'_d)^2}} + 1\right)}} \quad \text{(Equation 20)}$$

free-space wavelength as:

$$\lambda = \lambda_{fs}\sqrt{\frac{2}{\mu_r\varepsilon'_r\left(\sqrt{1 + \frac{(\varepsilon''_d + \frac{\sigma}{\omega})^2}{(\varepsilon'_d)^2}} + 1\right)}}. \quad \text{(Equation 21)}$$

With respect to Equations 20 and 21, $\lambda_{fs}$ is the free-space wavelength in meters (m); and $\in'_r$ is the real part of the relative permittivity. Because the radar cross section for an object is at its maximum at the frequency (considered its primary resonant frequency) that corresponds to a wavelength equal to a physical dimension of the object, and because the relationship between wavelength and frequency is affected by the surrounding medium, an object's primary resonant frequency is also affected by the surrounding medium.

Once the phase constant of the dielectric medium 302 is known, the detection device 306 can be calibrated to account for the shifting of the resonant frequencies. After the detection device 306 is properly calibrated, other objects 312 with a known free-space spectral response can be located within the dielectric medium 302.

Figure 4:
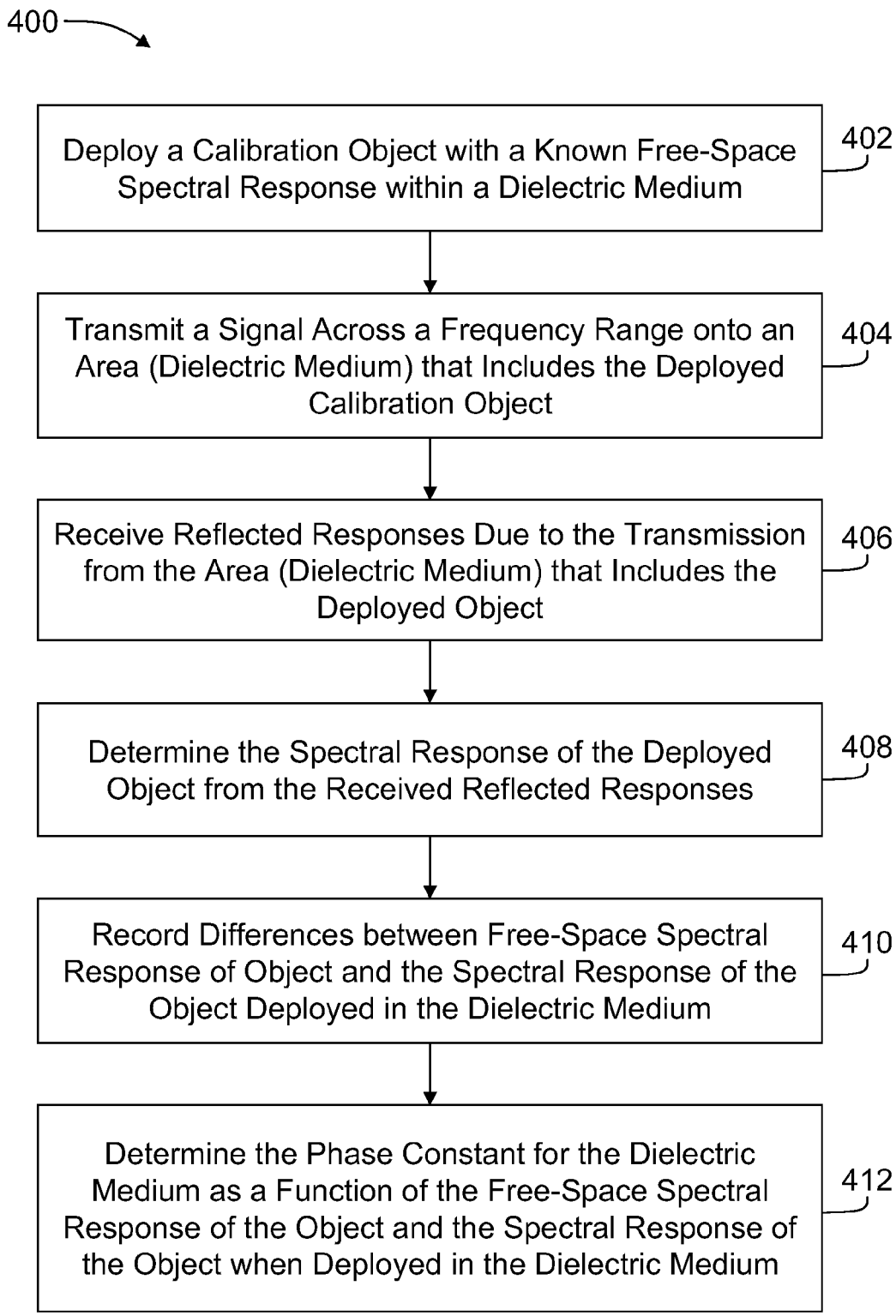
FIG. 4 is a flowchart of a method for determining the phase constant of a dielectric medium.

FIG. 4 is a flowchart of a method for determining the phase constant of a dielectric medium. The method illustrated by flowchart 400 includes the steps of deploying 402 a calibration object with a known free-space spectral response, within a dielectric medium. The method also includes transmitting 404 a signal across a frequency range onto an area that includes the deployed object. Reflected responses due to the transmission 404 are received 406 from the area that includes the deployed object and the spectral response of the calibration object in the dielectric medium is determined 408 from the received 406 reflected responses. Differences between a free-space spectral response and a spectral response of the object when embedded in the dielectric medium are noted 410, and the phase constant for the dielectric medium as a function of the known free-space spectral response of the calibration object and the spectral response of the calibration object in the dielectric medium is determined 412.

As a consequence of determining phase constant for the dielectric medium, the effect of the medium on the spectral response of any object embedded in it is also provided. As described herein, if the phase constant of a dielectric medium has been determined, the reflected spectral response, including the resonant frequencies, of a buried object can be predicted, and resonant RF location can be used to detect and identify the object.

This written description uses examples to disclose the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for remotely determining the phase constant for a dielectric medium, said method comprising:
   deploying a calibration object with a known free-space spectral response within a dielectric medium of interest;
   determining the spectral response of the calibration object deployed in the dielectric medium; and
   determining the phase constant for the dielectric medium using a relationship between the free-space spectral response of the calibration object and the spectral response of the calibration object when deployed in the dielectric medium.

2. The method of claim 1 further comprising providing a plurality of calibration objects.

3. The method of claim 2 wherein providing a plurality of calibration objects further comprises providing a plurality of calibration objects with the same known free-space spectral response.

4. The method of claim 2 wherein providing a plurality of calibration objects further comprises providing a plurality of calibration objects with at least one of the plurality of calibration objects having a different known free-space spectral response than another of said plurality of calibration objects.

5. The method of claim 1 further comprising deploying the calibration object from at least one of an air vehicle, a ground vehicle, a water vehicle, and a permanent station.

6. The method of claim 1 further comprising using the determined phase constant to detect other objects within the dielectric medium.

7. The method of claim 1 wherein providing a calibration object with a known free-space spectral response further comprises providing a calibration object that is capable of being deployed into the dielectric medium as a projectile.

8. The method of claim 1 further comprising:
   transmitting a signal across a frequency range onto an area that includes the deployed calibration object within the dielectric medium; and
   receiving reflected responses due to the transmission from the area that includes the deployed object.

9. The method of claim 8 wherein:
   determining the spectral response of the calibration object deployed in the dielectric medium comprises determining the spectral response of the calibration object from the reflected responses; and
   determining the phase constant for the dielectric medium comprises recording differences between a free-space spectral response of the calibration object and a spectral response of the calibration object when embedded in the dielectric medium.

10. The method of claim 8 wherein transmitting a signal across a frequency range onto an area comprises using a transmitter to perform a signal sweep to determine the resonant frequency of the calibration object embedded within the dielectric medium.

11. The method of claim 8 wherein using a detection device further comprises calibrating the detection device once the phase constant is known, in order to detect other objects located in the dielectric medium.

12. The method of claim 1 wherein determining the phase constant for the dielectric medium further comprises using a processor to determine the phase constant.

13. A system for determining a phase constant for a dielectric medium, said system comprising:
   a calibration object having a known free-space spectral response and capable of being deployed within a dielectric medium for which the phase constant is to be determined
   at least one transmitter;
   at least one receiver, said at least one transmitter and said at least one receiver operable to determine a resonant frequency response of said calibration object when said calibration object is deployed within the dielectric medium; and
   a processor operable to determine the phase constant for the dielectric medium utilizing the known free-space spectral response and the resonant frequency response of said calibration object within the dielectric medium.

14. The system of claim 13 further comprising a plurality of calibration objects.

15. The system of claim 14 wherein said plurality of calibration objects all have the same known free-space spectral response.

16. The system of claim 14 wherein at least one of said plurality of calibration objects has a different known free-space spectral response than another of said plurality of calibration objects.

17. The system of claim 13 wherein said processor is operable to calibrate said at least one transmitter and said at least one receiver to detect other objects in the dielectric medium once the phase constant for the dielectric medium is known.

18. The system of claim 13 wherein said calibration object is capable of being deployed from at least one of an air vehicle, a ground vehicle, a water vehicle, and a permanent station.

19. The system of claim 13 wherein said calibration object is capable of being deployed as a projectile.

20. The system of claim 13 wherein said processor is configured to be communicatively coupled to said at least one transmitter and said at least one receiver.

21. The system of claim 20 where at least one of said processor, said at least one transmitter, and said at least one receiver are mounted on one or more of an air vehicle, a ground vehicle, a water vehicle, and deployed at a permanent station.

* * * * *